J. H. MILTIMORE.

Lantern.

No. 2,555. Reissued April 9, 1867.

Witnesses:
G. W. Hughes.
J. D. Willoughby

Inventor:
J. H. Miltimore
By H. C. Dodge.
his Attorney.

N. PETERS, Photo-Lithographer, Washington, D. C.

United States Patent Office.

J. HARVEY MILTIMORE, OF CHICAGO, ILLINOIS.

*Letters Patent No.* 49,290, *dated August* 8, 1865; *reissue No.* 2,555, *dated April* 9, 1867.

IMPROVEMENT IN LANTERNS.

The Schedule referred to in these Letters Patent and making part of the same.

TO ALL WHOM IT MAY CONCERN:

Be it known that I, J. H. MILTIMORE, of Chicago, in the county of Cook, and State of Illinois, have invented certain new and useful improvements in Lanterns; and I do hereby declare that the following is a full, clear, and exact description thereof, reference being had to the accompanying drawings, and to the letters of reference marked thereon, making a part of this specification.

The nature of my invention consists in so constructing the frame of a lantern that the glass globe can be readily removed through the base or through the bottom of the guard for the purpose of cleaning it, or the introduction of another when one is broken. It also consists in a novel method of securing the lamp in place, and of fastening the globe.

To enable others skilled in the art to make and use my improvement, I will proceed to describe it.

Figure 1:
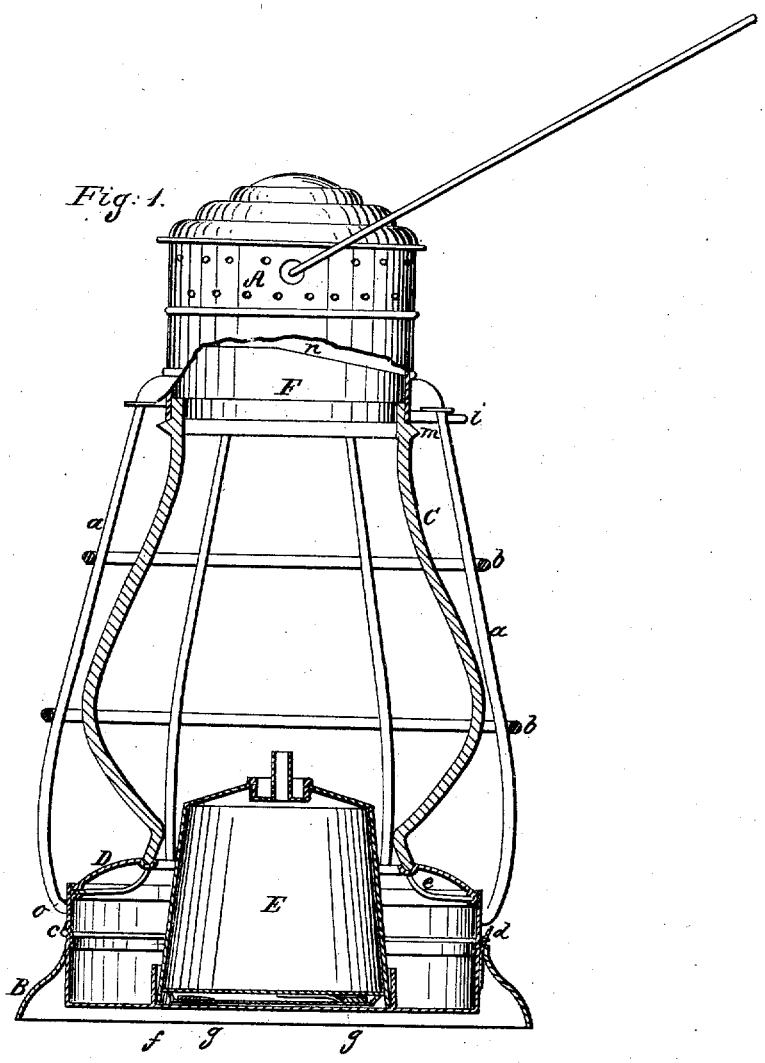
Figure 2:
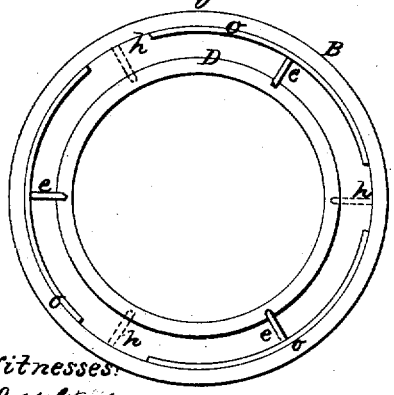
Figure 3:
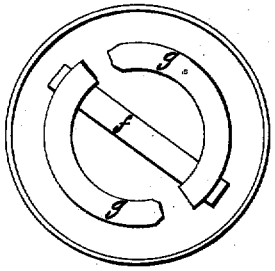
Figure 4:
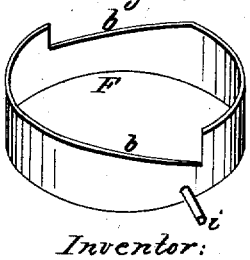

A represents the upper portion of lantern constructed in any of the usual forms, and rigidly united to the upper portion of the base B by the wires *a*. Two or more wires, *b*, pass around and are soldered or otherwise attached to the wires *a*, as shown in Figure 1, and firmly uniting them, thereby forming a firm and strong frame, which serves the double purpose of uniting the top and base, and also protecting the globe C, placed inside of the same. The base or bottom portion is composed of two parts hinged together at *c*, a spring-catch, *d*, serving to hold them together on the opposite side, as shown. The upper portion or the vertical band forms a part of the guard, and the lamp is secured or attached to the lower portion. The top or upper portion of the base B is left open to nearly or quite its full diameter, so that the globe C can be inserted through it into the interior of the guard-frame. An annular piece of sheet metal, D, shown in section in fig. 1, and in plan in Figure 2, is constructed of the proper size to fit into the opening in the top of the base B, where it is secured by means of the lugs or projections *e*, which engage above and rest upon the circular ledges O, as shown in figs. 1 and 2, the projections *e* entering the notches or spaces *h*, as shown in red in fig. 2, after which, by turning D either to the right or to the left, they are securely locked in place. The piece D is provided with a groove on its upper surface, near its inner edge, for the bottom of the globe C to rest in, as shown in fig. 1. A metal band, F, is fitted within the lower part of cap A, with its lower edge resting upon the shoulder *m*, cast upon the globe C, near its upper end. Portions of the upper edge of this band F are cut away, so as to form the inclines *l*, as shown more clearly in Figure 4. A wire or rod, *n*, extends across the interior of the cap A, as shown in section in fig. 1, in such a position that when the band F is inserted in place the upper edge of the band shall come in contact therewith. Near the centre of the bottom of the lantern two spiral flat strips of metal, *g*, are secured, these strips being soldered or otherwise fastened at one end only, the other end being left loose and slightly raised. A cross-bar, *f*, is secured at each end to the bottom of the lamp E. This bar *f* being entered under the loose ends of the arms or strips *g*, as shown in red in Figure 3, can then be turned so as to be securely fastened thereby, thus holding the lamp firmly in place, a reverse movement serving to release the lamp whenever it is desired to remove it for any purpose whatever. To remove the globe it is only necessary to open the base and turn the disk or ring D far enough to bring the lugs *e* opposite the notches *h*, when it can be removed, and the globe withdrawn through the band. When the globe is inserted in place it is held firmly in its seat by simply turning the band F, which can be readily done by means of the handle or pin *i*, which causes it to be forced down upon the shoulder *m*, by means of the incline *l* pressing against the rod *n*. By these means I produce a lantern having an adjustable globe, and a lamp and base at all times securely attached, and which is not rendered valueless by the breaking of the globe, as is the case in lanterns of ordinary construction, and one in which a new globe can be inserted, or the old one removed almost instantly and at pleasure.

Having thus fully described my invention, what I claim as new, and desire to secure by Letters Patent, is—

1. The upper portion of the base B when so constructed as to admit of the passage of an adjustable globe through it, and made a part of the guard, and also connected with the lower or flanged portion by a hinge and spring, substantially as shown.

2. The combination of the lower portion of the base B, which supports the lamp, with the upper vertical portion, which forms a part of the guard in a lantern having the globe removable through such upper portion of the base, substantially as specified.

3. The disk or ring D, provided with the lugs *e*, in combination with the projections *o* of the base B, arranged and operating as and for the purposes set forth.

4. I claim the band F provided with the inclines *l*, in combination with the rod *u*, substantially as and for the purposes set forth.

5. I claim securing the lamp by means of the bar or strip *f*, and arms *g*, when arranged to operate substantially as described.

J. HARVEY MILTIMORE.

Witnesses:
L. L. BOND,
E. A. WEST.